H. CHARM.
VEHICLE TIRE PROTECTOR.
APPLICATION FILED MAR. 18, 1912.

1,123,486.

Patented Jan. 5, 1915.

Witnesses:
N. C. Lombard
Edward F. Allen

Inventor:
Hyman Charm,
by Walter E. Lombard,
Atty ically feasible.# UNITED STATES PATENT OFFICE.

HYMAN CHARM, OF DORCHESTER, MASSACHUSETTS.

VEHICLE TIRE-PROTECTOR.

1,123,486.

Specification of Letters Patent.  Patented Jan. 5, 1915.

Application filed March 13, 1912.  Serial No. 684,635.

*To all whom it may concern:*

Be it known that I, HYMAN CHARM, a citizen of the United States of America, and a resident of Dorchester, in the county of Suffolk and State of Massachusetts, have invented certain new and useful Improvements in Vehicle Tire-Protectors, of which the following is a specification.

This invention relates to protectors for vehicle tires, and has for its object the production of a protector which, while very resilient, will present a good gripping surface and protect a pneumatic tire from puncture.

It has for a further object the production of a resilient protector which is provided with a plurality of anti-skidding members.

It consists primarily in a covering for the tire composed of a plurality of interlocked helical springs retained in position by means of a plurality of connectors interposed between the outer springs and adjustable annular members by adjustment of which the protector is drawn firmly against the outer surface of the pneumatic tire.

The invention further consists in certain novel features of construction and arrangement of parts which will be thoroughly understood by reference to the drawings and to the claim hereinafter given.

Figure 1:
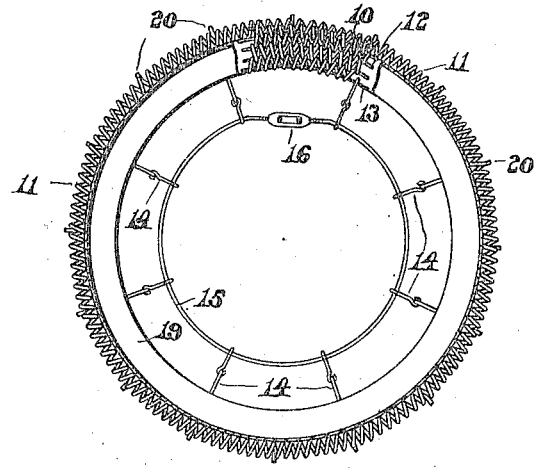
Figure 3:
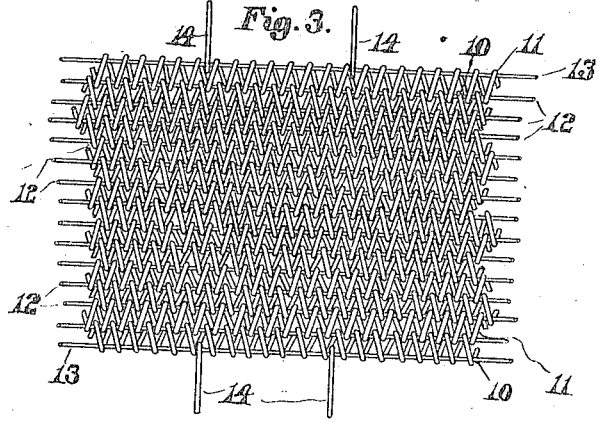
Figure 4:
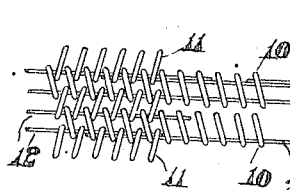
Figure 2:
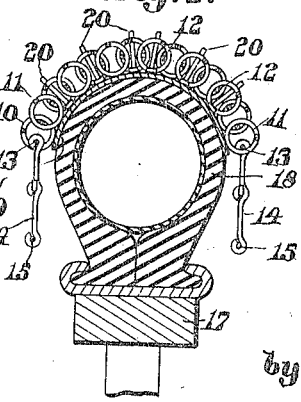
Figure 5:
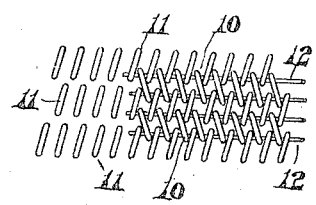

Of the drawings: Figure 1 represents a vertical section of a protector embodying the features of the present invention, a small portion thereof being shown in elevation. Fig. 2 represents a transverse section of a pneumatic tire showing in section the protector applied thereto, this figure being drawn to an enlarged scale. Fig. 3 represents a plan of a portion of the protector showing the means of interlocking the various helical springs together, and Figs. 4 and 5 represent diagrammatical views showing the ends of the protector with the various springs thereof in echelon and adapted to dovetail into each other to form a joint.

Similar characters designate like parts throughout the several figures of the drawings.

In the drawings, 10 represents a plurality of right hand helical springs and 11 represents a plurality of left hand helical springs, these springs alternately intermeshing one another. Each pair of overlapping springs is locked together by means of a wire 12 inserted through the overlapping portions of said springs, thereby joining all of the springs together in parallelism. In each outer spring is inserted another wire 13 to which is attached a plurality of connecting members 14, the opposite ends of which encircle an annular divided member 15, the ends of which are threaded and have mounted thereon a turnbuckle 16. The diameter of the annular member 15 is considerably less than the diameter of the protector formed of the plurality of springs interlocking as described. There is an annular member on either side of the wheel 17, and each of these annular members 15 may have its diameter decreased by the operation of the turnbuckle 16 in an obvious manner, thereby drawing the edges of the protector over the pneumatic tire 18 and in firm contact therewith. Interposed between the pneumatic tire 18 and the springs 10 and 11, and preferably connected thereto by any well-known means, is a sheet 19 of leather or some other tough material, which performs the office of protecting the outer surface of the rubber tire from the rubbing contact therewith of the spring protector. Bearing upon the outer face of the sheet 19 are the heads of a plurality of anti-skidding members 20 the shanks of which extend through the coils of the springs 10 and 11. As the wheel rotates about its axis a greater length of the shanks of these anti-skidding members is uncovered owing to the compression of the springs, and thereby they are permitted to secure a firm hold upon the surface of the ground over which the vehicle is passing. These members effectually prevent skidding of the vehicle as sharp corners are turned or when traveling rapidly on wet surfaces. As the wheel rotates about its axis the coils of the springs yield considerably and add greatly to the resiliency of the tire. When interlocked, as has been described, the springs form an effectual armor for the tire whereby nails and other sharp articles are effectually prevented from contacting with the pneumatic tire and injuring the same. Owing to the resiliency of the spring protector, should a nail be picked up while the spring is under compression, as it passes over the road, as soon as that portion of the tire in the rotation of the wheel leaves the ground, the expansion of the spring will throw the article from the surface of the tire. In order to form a perfect joint between the ends of the protector every alternate spring at one end extends for several coils beyond the others, while at the opposite end of the protector these other springs extend considerably beyond the ends of the first mentioned springs, as indicated in Figs. 4 and 5 of the drawings. With some of these ends alternately extending beyond intermediate ends the projecting coils at each end of the protector are interlocked with the projecting ends on the opposite end of the protector by a plurality of short wires 21 extending between the ends of each of the springs as is indicated in Figs. 4 and 5 of the drawings.

It is believed that the operation and many advantages of the invention will be thoroughly understood from the foregoing.

Having thus described my invention, I claim:

A removable protector for vehicle tires adapted to be temporarily positioned on the outer surface of a tire, consisting of a plurality of intermeshed right and left hand helical springs extending circumferentially of said tire, wires inserted in the intermeshes of said springs and extending throughout the length thereof with their ends at different points from the ends of said springs, and an additional wire in each spring with its ends inserted in opposite ends of the helical spring.

Signed by me at 4 Post Office Sq., Boston, Mass., this 16th day of March, 1912.

HYMAN CHARM.

Witnesses:
WALTER E. LOMBARD,
NATHAN C. LOMBARD.